US00RE43736E

(19) United States
(12) Reissued Patent
Brown

(10) Patent Number: US RE43,736 E
(45) Date of Reissued Patent: Oct. 16, 2012

(54) PERFORATED VACUUM HOLD DOWN SURFACE

(75) Inventor: Eric Brown, Cary, NC (US)

(73) Assignee: Gerber Scientific International, Inc., Tolland, CT (US)

(21) Appl. No.: 11/396,223

(22) Filed: Mar. 31, 2006

Related U.S. Patent Documents

Reissue of:
(64) Patent No.: 6,889,967
Issued: May 10, 2005
Appl. No.: 10/256,356
Filed: Sep. 27, 2002

(51) Int. Cl.
*B25B 11/00* (2006.01)

(52) U.S. Cl. ..... 269/21; 156/541

(58) Field of Classification Search ..... 296/21; 156/541, 542, DIG. 33, DIG. 25, DIG. 28, 156/DIG. 21; 248/363; 271/211, 195; 406/84–89; 269/21
See application file for complete search history.

(56) References Cited

U.S. PATENT DOCUMENTS

| | | | | |
|---|---|---|---|---|
| 3,645,832 | A | 2/1972 | Sauer | |
| 4,301,999 | A | 11/1981 | Higgins et al. | |
| 4,587,873 | A | 5/1986 | Gerber | |
| 4,702,664 | A | 10/1987 | Lukens, Jr. | |
| 5,487,536 | A | 1/1996 | McEachin | |
| 6,182,957 | B1 * | 2/2001 | Becker | 269/21 |
| 6,344,256 | B1 * | 2/2002 | Steadman | 428/131 |
| 6,422,548 | B1 * | 7/2002 | Baber et al. | 269/21 |
| 6,540,001 | B1 | 4/2003 | McNestry | |
| 6,889,967 | B2 * | 5/2005 | Brown | 269/21 |
| 2004/0061267 | A1 * | 4/2004 | Brown | 269/21 |

FOREIGN PATENT DOCUMENTS

| | | |
|---|---|---|
| FR | 2784926 | 3/2000 |
| FR | 2784926 | 4/2000 |
| GB | 2109716 | 9/1982 |
| GB | 2109716 A | 9/1982 |
| GB | 2109716 | 7/1983 |
| JP | 5859740 | 4/1983 |
| JP | 61270098 | 11/1986 |
| JP | 63261249 | 10/1988 |
| WO | PCTGB91/02176 | 12/1991 |

* cited by examiner

*Primary Examiner* — Lee D Wilson
(74) *Attorney, Agent, or Firm* — Crowell & Moring LLP

(57) ABSTRACT

A vacuum hold down table includes a surface sheet having perforations arranged so as to reduce surface cracking when the surface sheet is subject to forces during use of the table; the perforations may also be arranged to that a greater hold down force is produced in that portion of the table where the workpiece will be located, this may be accompanied by varying the hole diameter and/or hole spacing.

49 Claims, 4 Drawing Sheets

PERFORATED VACUUM HOLD DOWN SURFACE

Matter enclosed in heavy brackets [ ] appears in the original patent but forms no part of this reissue specification; matter printed in italics indicates the additions made by reissue.

BACKGROUND OF THE INVENTION

The present invention relates to perforated sheet material used in vacuum hold down systems and to vacuum hold down systems which utilize said perforated sheets. Such vacuum hold down systems are used in the cutting of sheet material such as cloth and leather in connection with production of clothing, upholstery and the like.

In operation, a vacuum hold down system provides for a reduced pressure on the bottom side of a perforated sheet. When a sheet of workpiece material is laid on the topside of the perforated sheet, the vacuum draws the sheet workpiece material down against the table and acts to resist lateral motion of the workpiece across the table, even under the influence of forces resulting from cutting. In the prior art of which I am aware, hold down surfaces for use with fabrics and impermeable sheet material such as leather have included straight rows of relatively uniformly spaced holes wherein the holes have an average diameter of about 0.013 inch, and the space between the holes is about 0.048 inch between the hole centers and the wall thickness between adjacent holes is about 0.035 inch. The spacing between the lines of holes is about 0.5 inches.

Prior art vacuum systems with uniformly distributed holes waste some of the available vacuum because a substantial fraction of the holes are not covered by the workpiece.

In the prior art vacuum surface sheets, the perforated sheets have tended to fail under the influence of the downward pressure of the cutting tool. Failures have generally occurred along the straight lines of spaced holes.

BRIEF SUMMARY OF THE INVENTION

There are two major aspects to the invention. The first major aspect of the invention lies in controlling the density of the number of holes and hole diameters across the table so as to maximize the effectiveness of the vacuum system in holding down workpiece materials. This aspect relates to the arrangement of holes on a large scale.

The second aspect concerns the geometric arrangement of the perforations or holes in the vacuum surface table. This aspect relates to the arrangement of holes on a small scale. Hole arrangements and patterns are described which reduce the likelihood of the table surface cracking and thereby increase the service life of the table. In one embodiment, the holes are disposed on curved rather than straight lines. In another embodiment the holes are arranged with controlled average hole spacing.

Both invention aspects can be combined in a perforated sheet.

DESCRIPTION OF THE PREFERRED EMBODIMENTS

The invention can be understood through consideration of the figures.

Figure 1:
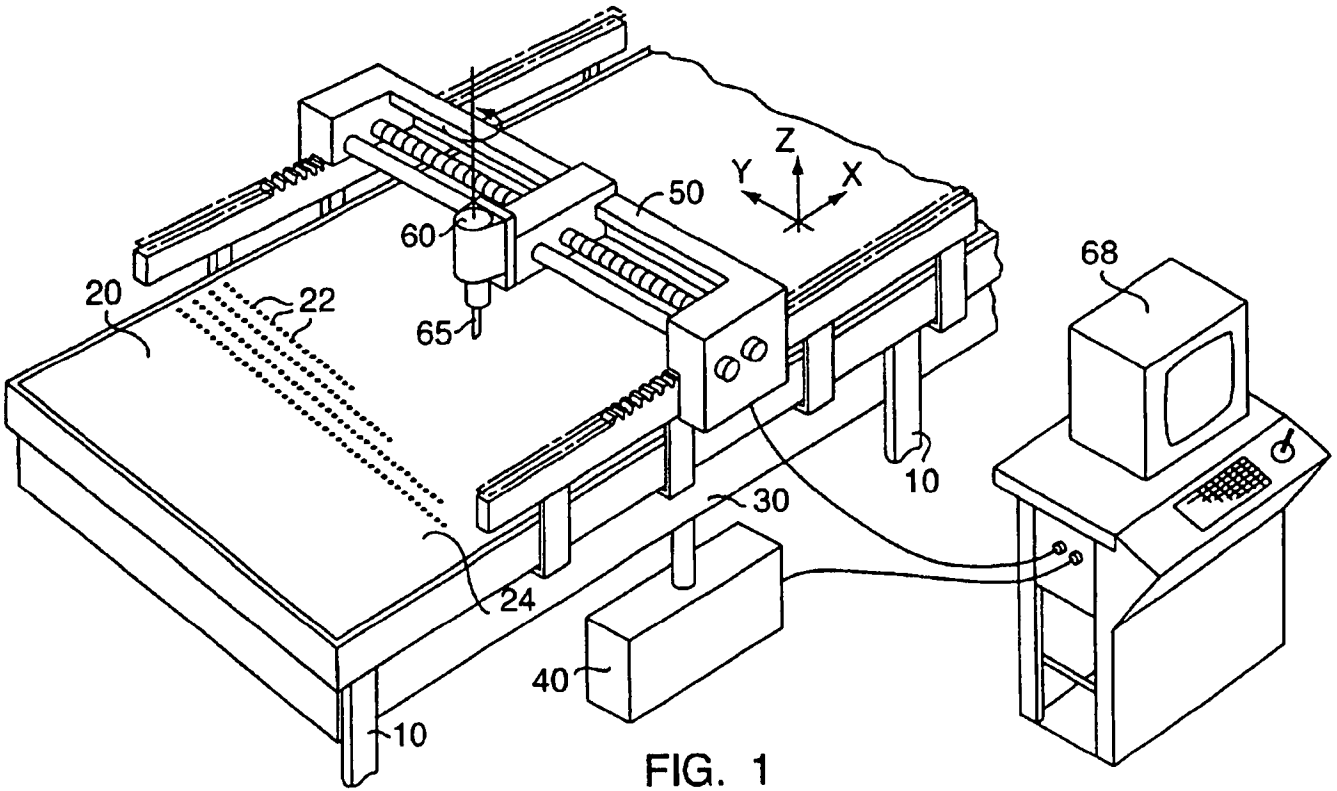
FIG. 1 PRIOR ART
FIG. 1 is a schematic view of a vacuum worktable with associated cutter means, and a prior art surface hole pattern.

FIG. 1 shows in schematic form a vacuum worktable of the type used to process sheet material such as cloth and leather. The table includes a supporting structure such as legs, 10. The table itself comprises a working table surface 24 which is the top surface of a flat sheet of material 20 which is essentially impervious to air. The sheet 20 contains a multiplicity of holes or perforations 22 which pass through the thickness of the sheet and connect the top major surface 24 of the sheet 20 of the sheet with the bottom major surface 26 of the sheet 20. Located beneath the surface sheet 20 is a plenum 30 which is connected to a vacuum system 40. The plenum is efficiently sealed to the bottom surface 26 of the work table surface sheet 20. In operation, the vacuum system reduces the pressure in the plenum 30 to below the ambient or atmospheric pressure. This causes air flow through the holes 22. The air flow through the holes 22 and the pressure differential across the surface sheet, between surfaces 24 and 26, causes a down force on the sheet workpiece material which is placed on the table, and the down force acts to resist movement of the workpiece on the table.

Also shown in FIG. 1 is a gantry 50 which is adapted to move relative to the table and a cutter assembly 60 which is mounted on gantry 50 which is adapted to more relative to the gantry 50. The combination of gantry motion and cutter motion provides and X and Y motion of the cutter assembly 60 permitting the cutter assembly 60 to cut the sheet material in a manner which is controlled by the cutter motion and the gantry motion. The cutter assembly 60 also provides rotary motion of the cutter about the Z-axis, perpendicular to the X and Y-axes, so that the cutter can be oriented in the direction of the desired cut. The cutter 65, may be either a single edge knife blade, or a rotating disk having a sharpened edge (a pizza cutter). In practice, the cutter assembly 60 and gantry 50 motions are controlled by controller 68, which maybe for example a computer, and the cutter acts on the sheet workpiece material to cut out predetermined shapes.

The surface sheet of the worktable may be made of a variety of materials. A primary requirement is that the material be essentially impervious to air. In a typical table used for cutting cloth and leather, the material I have used is polypropylene of a thickness of about 0.2 inches. Other plastic materials may be used for the table surface. Also in practice, where table surfaces are large, a skeletal supporting structure (not shown) is provided within the vacuum plenum to support the surface sheet at numerous points over its area in order to minimize sheet deflection under the action of the vacuum.

Figure 2:
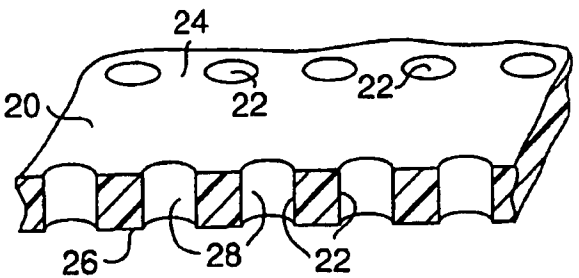
FIG. 2 is a cross section through a hole in a vacuum work table surface.

FIG. 2 shows a cross section of the surface sheet 20 including a cross section through holes 22 which passes through surface sheet 20. The holes 22 are defined by surfaces 28 which pass from the one major surface 24 to the other major surface 26 of surface sheet 20. The holes may be circular in cross section or may have any other cross-section. The tables produced by the assignee of the present invention have oval holes. When non-circular holes are used, the term effective diameter will be used to define the non-circular holes in terms of circular holes of equal area. The holes may be produced by laser drilling or any other appropriate technique.

The holes 22 have effective diameters of approximately 0.0008 to 0.030 inches. Holes that are smaller in diameter than about 0.0008 inches are prone to blockage by dust and debris resulting from the cutting operation while holes greater than about 0.030 inches are undesirable since they can interfere with the motion of the cutting tool.

Figure 3:
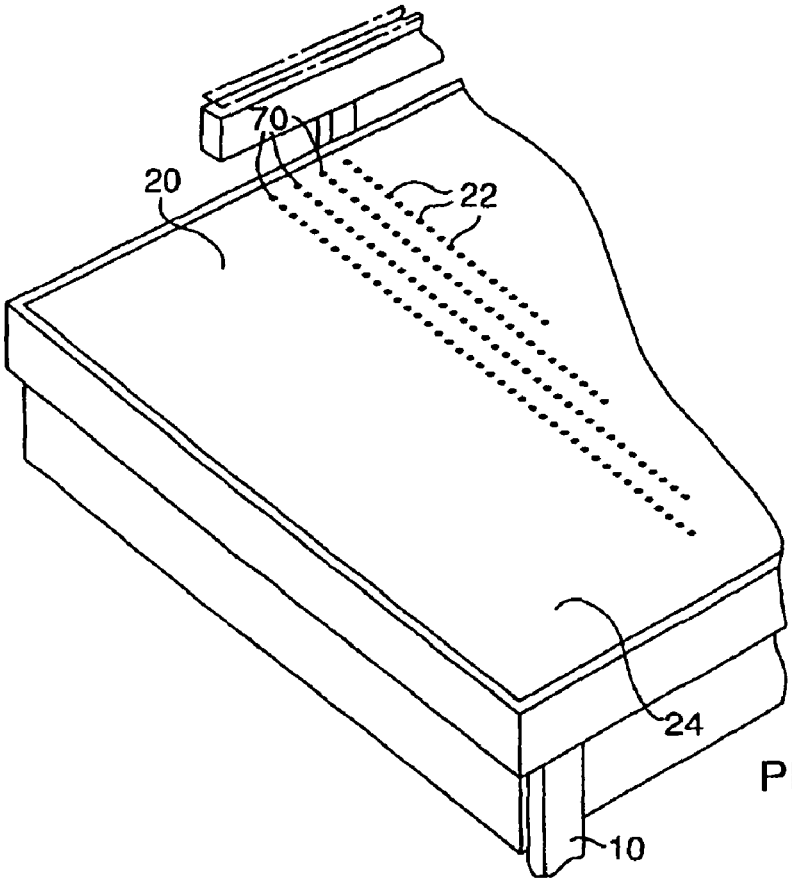
FIG. 3 PRIOR ART
FIG. 3 shows the hole pattern used in the prior art.

FIG. 3 illustrates the hole pattern used in prior art tables produced by the Assignee of the present invention and its corporate predecessors. As shown in FIG. 3, the hole pattern used in the prior art consists of numerous holes having an average diameter of 0.013 in. arranged in straight parallel rows. The spacing of the holes within the rows is about 0.048 in. measured from the center of one hole to the center of the next hole. This leaves a wall thickness of about 0.035 in. In this arrangement, each hole (except for holes of the edges of the sheet) has two nearest neighbors, and the hole and its nearest neighbors lie on a straight line.

The present invention relates to vacuum tables used to cut sheet material such as cloth and leather. The cutter 65 mounted in the cutter assembly 60 shown in FIG. 1, either a rotating sharpened cutting wheel, or a non-rotating stationary knife, bears down on the top surface 24 of the surface sheet 20 during the cutting operation. The cutter is forced against the top surface 24 to completely cut the workpiece sheet material. It has been found in past practice that the prior art surface sheet 20 tends to fail by cracking along the lines of holes shown in FIG. 3. The cracking apparently results from the cutter being forced against the table.

A common use for vacuum tables and vacuum tables with cutting equipment such as has been previously described is in the cutting of leather hides. The vacuum table designs previously used have had constant hole densities (measured as holes per square foot) over their entire surface, where the hole density is the number of holes per unit area multiplied by the cross-sectional area of the holes, or the sum of the hole areas in a unit area of table surface.

A higher hole density produces a greater down force on the workpiece, for a given pressure differential across the surface. Higher down forces are generally desired in the workpiece zone, I prefer to have at least 3 pounds per square foot and preferably at least 5 pounds per square foot of down force on the workpiece. However, if the aperture density is high over the entire surface, the vacuum system maybe overloaded; certainly power consumption and noise levels will be increased.

In the prior art constant hole density tables, it has been common practice to place plastic sheeting over portions of the table which will not be covered by the workpiece, but this adds to material and labor costs.

According to the present invention, vacuum table surfaces are produced having at least two zones. At least one zone (the inner or workpiece zone) corresponds approximately in size and shape to the size and shape of the workpieces to be processed. The hole density in the workpiece zone is greater than the hole density over the balance of the table. Preferably, the hole density in the workpiece zone(s) is at least about 20% greater than the hole density in the balance of the table area.

The down force produced by a vacuum table is approximately proportional to the hole density (assuming the pressure differential across the table surface is constant). Thus, the invention can also be described in terms of the difference in down force on a workpiece in the different zones on the table. In the workpiece zone(s) which corresponds approximately to the size and shape of the intended workpiece, the average down force, per unit area, on a workpiece is greater than the average down force which would be observed on a workpiece outside of the workpiece zone. Preferably the down force is the workpiece (zones) is at least about 20% greater than the down force in other areas of the table surface.

When a workpiece, such as a cowhide, is placed on the vacuum table in preparation for cutting, the common practice is to cover the edges of the cowhide with strips of thin plastic called "plastic overlay" material in the art. The purpose of the plastic strips is to seal the hide periphery to the vacuum table and to prevent air from leaking between the irregular hide contour surface and the flat vacuum table surface.

The invention includes the provision of a vacuum hold down table for use with irregularly shaped products such as hides which the table work surface includes at least one workpiece zone having a particular density and spacing of holes wherein the workpiece zone is the region which will be largely covered by the workpieces to be cut. Conversely, the workpiece zone is sized and shaped so that the majority intended workpiece will lie in the workpiece zone. There is another region, the outer zone, which has a reduced density and spacing of holes relative to the central region. There may also be one or more intermediate zones between the inner zone and the outer zone. The number density and/or hole diameters in the one or more intermediate zones are arranged to produce a decrease in hole density in the direction between the workpiece zone and the outer zone.

Figure 4:
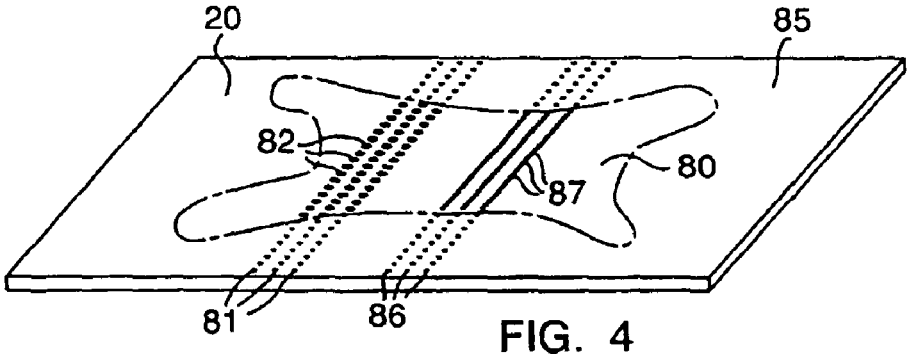
FIG. 4 shows a surface hole pattern with an increased hole density in the region of the sheet where the workpiece is located.

FIG. 4 illustrates in schematic form how the hole density can be changed on the surface of a vacuum hold down table by changing the diameter of the holes on the lines which are generally outside of the region where the workpiece will cover the table (the workpiece zone). In FIG. 4 the hole size is reduced as the rows move away from the outline of the workpiece into the outer zone 85; an equivalent result can be obtained by using constant diameter holes and changing the spacing between the holes to provide a higher hole density 87 in the workpiece zone 80. Finally, the size and spacing of holes can simultaneously varied to achieve the desired result.

Figure 5:
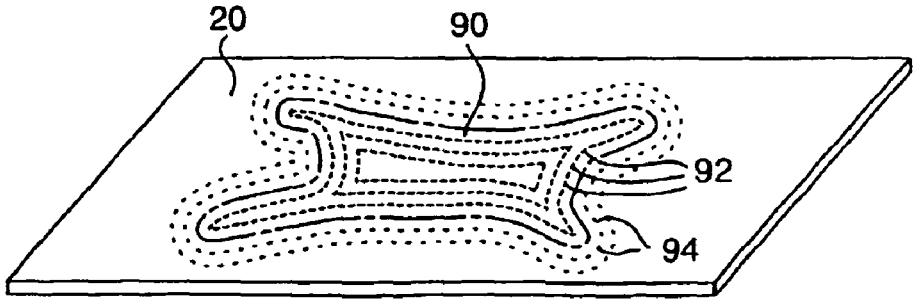
FIG. 5 shows another hole matter with an increased hole density in the region of the sheet where the workpiece is located.

FIG. 5 shows an arrangement in which an outline is drawn around the outline of the workpiece. A pattern of holes within the outline provides a first down force per unit area of workpiece. Concentric lines of holes extend around the workpiece outline. The concentric lines have hole densities which decrease with distance from the outline of the workpiece and provide a reduced down force relative to the down force in the workpiece zone. The hole density can be decreased by either decreasing the number of holes while maintaining the same diameter or by decreasing the diameter of the holes/unit area while maintaining roughly the same number of holes per unit area or some combination thereof.

It will be understood that one aspect of the invention is to arrange the size and spacing of the apertures on the vacuum table with due consideration to the workpieces to be processed in such a fashion that the down force in the central zone of the workpiece is greater than about 3 lbs./sq. ft. and preferably greater than about 5 lbs./sq. ft. and that the down force produced by the holes which are more than approximately 12" or so outside of the workpiece zone be less than the average down force in the workpiece zone.

Figure 6A:
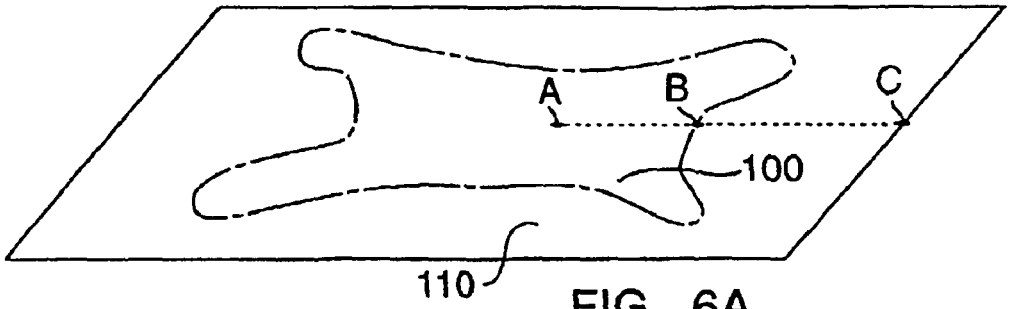
FIG. 6A shows a surface hole pattern with a workpiece zone and an outer zone.
Figure 6B:
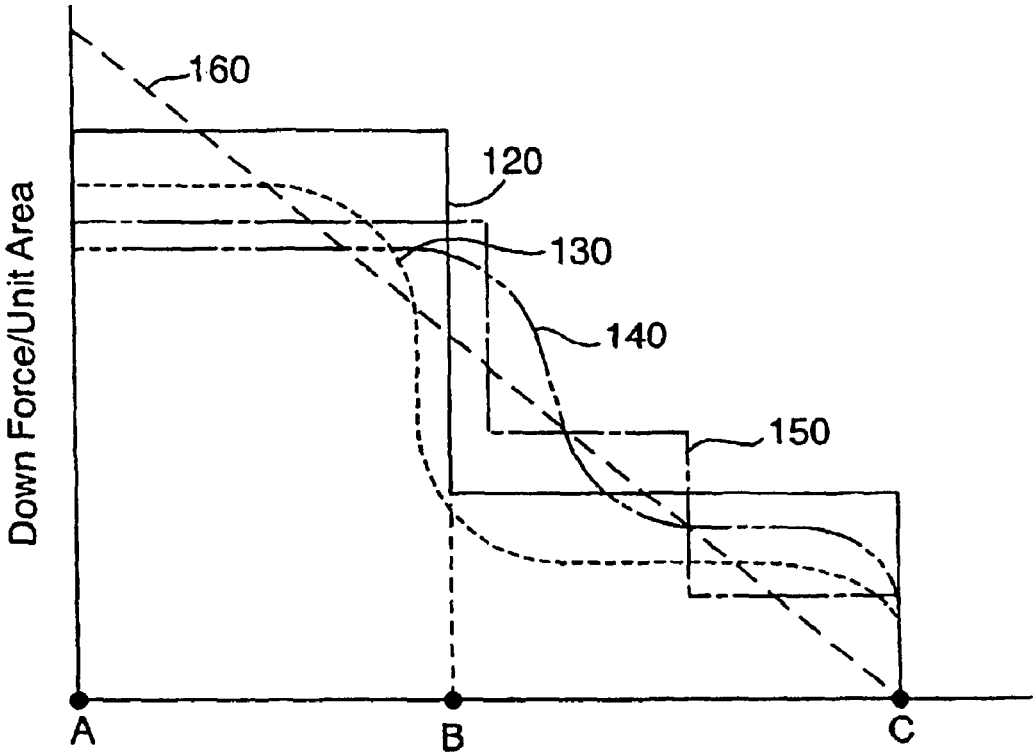
FIG. 6B shows exemplary variations in the hole density, from the center of the workpiece zone to the edge of the table, in the surface hole pattern of FIG. 6A.

As shown in FIGS. 6A and 6B, the transition between the workpiece zone and the region away from the workpiece zone may be accomplished in a variety of ways. FIG. 6A shows, in schematic form, a vacuum table with a workpiece zone 100, and an outer zone 110. FIG. 6B shows some examples of how the aperture density can vary between the workpiece zone and the outer periphery of the table. FIG. 6B plots down force (force per unit area) vs. distance on the work table surface along the line A-B-C in FIG. 6A. Curve 120 shows a constant aperture density within the workpiece zone, and a step down to a lesser constant aperture density in the outer zone. Curve 130 shows a smoothed step reduction in aperture density. Curve 140 shows a smoothed two step reduction in aperture density. Curve 150 shows a three-step reduction in aperture density. Curve 160 shows a constant rate reduction in aperture density. These curves are only examples of the many ways in which aperture density can vary between a high aperture density workpiece zone and the balance of the table.

It will be appreciated that the invention concept of varying the hole density in different areas or zones of the table can be used to design a vacuum table surface that takes into account other factors, including the provision of enhanced hold down forces where large numbers of cuts are anticipated.

Figure 7:
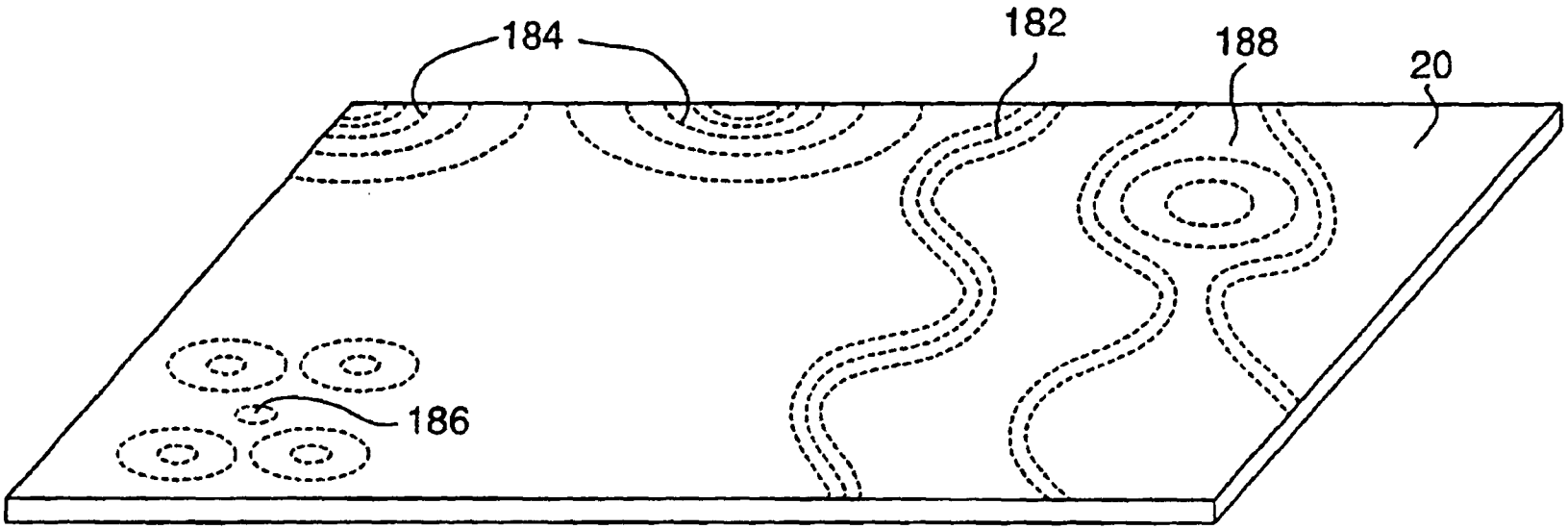
FIG. 7 shows various hole patterns of the invention.

A second aspect of the present invention relates to the arrangement of the holes in the surface sheet so as to increase the life of the sheet before cracking occurs. This is shown in FIG. 7. By arranging the holes along curved lines, rather than straight lines, the likelihood of fracture is reduced. Holes in the table have nearest neighbor holes. The hole and its nearest neighbors lie on a curved line. Thus in FIG. 7 holes may be arranged along a generally sinusoidal curved line 182. Holes may also be arranged along curved or semicircular or completely circular patterns 184, and 186, illustrates a pattern of concentric circles, 188 shows a pattern of out of phase sinusoidal curves with intervening circular patterns. There are limitless patterns of curves which can be employed. In general, the average radius of curvature of a line of holes should be from 1 to 100 in. The hole spacing and/or effective hole diameter may be varied along the curved line.

I require that there be from about 1,000 holes per square foot and preferably at least about 2,000 holes per square foot of the previously mentioned diameters, 0.008 to 0.030. I particularly prefer to have from about 2,000 to about 4,500 holes per square foot having an average diameter of from about 0.018 to about 0.025 in. When the holes are disposed on curved lines, I prefer that the lines of curvature have average radii ranging from about one inch to 100". It is also possible to provide a hole patterns in which the holes are spaced apart to reduce cracking. In this case I prefer that the nearest hole be located at least 0.060 away on average from adjacent holes, measured from hole center to hole center, and that a minimum average wall thickness of 0.040 exist between all adjacent holes.

Although this invention has been shown and described with respect to the detailed embodiments thereof, it will be understood by those skilled in the art that various changes in form and detail thereof may be made without departing from the spirit and scope of the invention.

What is claimed is:

1. A vacuum hold down table which includes:

a) a [perforated] *table* surface sheet for receiving a workpiece, said workpiece being a sheet of material;

b) a frame and support system to locate and support said table surface *sheet* while providing fluid access to the bottom of said *table* surface sheet;

c) at least one plenum assembly located beneath said table surface sheet, said at least one plenum *assembly* having side walls which abut said table surface sheet, at least about the periphery of said table surface sheet;

d) a vacuum system adapted to reduce the pressure in the plenum *assembly* to below ambient pressure; thereby creating a pressure differential across the thickness of [the] *said table* surface sheet;

e) said *table* surface sheet having perforations located in at least two zones, with different aperture densities in different zones, whereby different effective hold down forces are produced on a workpiece in the different zones, wherein there is a central zone, whose size and shape corresponds approximately to the size and shape of the workpiece and an outer zone which is outside of the central zone;

f) wherein the number and size of the perforations in the [inner] *central* zone combine to produce a first hold down force on the [sheet] workpiece located in the [inner] *central* zone, *and* the number and size of the perforations in the outer zone combine to produce a second, lesser, hold down force on sheet material located in the outer zone.

2. A vacuum hold down table which includes:

a) a [perforated] surface sheet for supporting a workpiece;

b) a frame and support system to locate and support said surface sheet, while providing fluid access to the bottom of said surface sheet;

c) at least one plenum assembly located beneath said surface sheet, said at least one plenum *assembly* abutting said surface sheet at least about the periphery of said [table] surface sheet;

d) a vacuum system adapted to reduce the pressure in the plenum *assembly* to below ambient pressure, thereby creating a pressure differential across the thickness of [the] *said* surface sheet;

e) said surface sheet having perforations, wherein said perforations are located on curved lines, wherein the average radius of curvature is from about 0.1 and 100 inches.

3. A vacuum hold down table as in claim 2 in which the perforations in [the] *said* surface *sheet* are distributed [so that there is a], *said surface sheet having a workpiece zone and an outer zone, the* workpiece zone [have] *having* an increased hole density relative to [an] *the* outer zone.

4. A vacuum hold down table as in claim 3 in which the density and size of the perforations in the workpiece zone combine to produce a hold down force per unit which is greater than the hold down force per unit area produced in the outer zone.

5. A vacuum hold down table comprising a perforated *work* table surface, and means to cause a pressure differential across said *perforated work* table surface so that ambient pressure causes a down force on workpieces placed on said perforated work table surface, said *perforated* work table surface having at least 1,000 perforations per square foot, wherein said [workpiece] *perforated work* table surface has at least one zone where the aperture density, in combination with the pressure differential produces a hold down force on a workpiece which is at least 20% greater than the hold down force produced on a workpiece on the balance of the *perforated work* table *surface*, wherein the apertures in at least [the] *a* center zone are arranged on curved lines.

*6. A vacuum hold down table as in claim 5 wherein the perforations are about 2,100 perforations per square foot.*

*7. A vacuum hold down table for holding a workpiece, the vacuum hold down table including:*

*a table surface sheet having a first zone and a second zone, each zone having perforations;*

*a enclosed space under said table surface sheet; and*

*a vacuum system adapted to reduce the pressure in the enclosed space below the ambient pressure and create a pressure differential across the table surface sheet;*

*wherein the perforations in the first zone produce a first hold down force, and the perforations in the second zone produce a second hold down force, the second hold down force different than the first hold down force, wherein the perforations in the first zone have a first density and the perforations in the second zone have a second density, wherein the first density differs from the second density.*

*8. The vacuum hold down table of claim 7 wherein spacing of the perforations, the number of perforations, or the effective diameter of the perforations is varied to produce a first perforations density in the first zone which differs from a second perforations density in the second zone.*

*9. The vacuum hold down table of claim 7 wherein the first zone has a size or a shape that corresponds approximately to the workpiece.*

*10. The vacuum hold down table of claim 7 wherein at least a number of the perforations are arranged along at least one curved line.*

*11. The vacuum hold down table of claim 7 wherein at least a number of the perforations are arranged along a generally sinusoidal line.*

*12. A vacuum hold down table for holding a workpiece, the vacuum hold down table including:*

*a surface sheet having perforations located on at least one curved line;*

*an enclosed space located under the surface sheet; and*

*a vacuum system adapted to reduce the pressure in the enclosed space below the ambient pressure and create a pressure differential across the surface sheet.*

*13. The vacuum hold down table according to claim 12 wherein the at least one curved line having an average radius of curvature from about 0.1 inches to about 100 inches.*

*14. The vacuum hold down table according to claim 12 wherein the perforations in the surface sheet are distributed, the surface sheet having a first zone and a second zone, the perforations in the first zone having a first density different than a second density of the perforations in the second zone.*

*15. The vacuum hold down table according to claim 12 wherein the perforations in the surface sheet are distributed, the surface sheet having a workpiece zone and a second zone, and wherein the number of perforations and the size of the perforations in the workpiece zone produce a workpiece hold down force per unit area and wherein the number of perforations and the size of the perforations in the second zone produce an outer hold down force per unit area when the surface sheet is subject to a pressure differential, the workpiece hold down force per unit area different than the second hold down force per unit area.*

*16. A vacuum hold down table comprising:*

*a table surface having a perforation density of at least 1,000 perforations per square foot, the perforations operative to produce a down force across the table surface when subject to pressure differential, the table surface having a first zone in which the perforation density is adapted to subject a workpiece positioned therein to a down force which is greater than the down force produced on a workpiece positioned on the table surface but not positioned in the first zone; and*

*a plenum system for subjecting the table surface to a pressure differential and generating a down force across the table surface.*

*17. The vacuum hold down table of claim 16 wherein at least a number of the perforations in the first zone arranged on curved lines.*

*18. The vacuum hold down table of claim 16 wherein at least a number of the perforations are arranged along a generally sinusoidal line.*

*19. A vacuum hold down table of claim 16 wherein the perforation density is about 2,100 perforations per square foot.*

*20. A hold down table for holding a workpiece, the hold down table including:*

*a table surface sheet having a first zone and a second zone, wherein the first zone and the second zone have perforations operative to generate a hold down force when subject to a pressure differential across the table surface sheet, the hold down force produced in the first zone different from the hold down force produced in the second zone, wherein the first zone has a greater perforation density than the second zone.*

*21. The hold down table according to claim 20 further including a plenum system adapted to create a pressure differential across the table surface sheet.*

*22. The hold down table according to claim 20 wherein at least a number of the perforations in at least the first zone are located on curved lines.*

*23. The hold down table according to claim 20 wherein at least a number of the perforations are arranged along a generally sinusoidal line.*

*24. The hold down table according to claim 20 wherein the number, the effective diameter, or spacing of the perforations in the first zone is varied such that the hold down force produced in the first zone is greater than the hold down force produced in the second zone.*

*25. The hold down table according to claim 20 wherein the first zone has a size or a shape that corresponds approximately to the workpiece.*

*26. A hold down table comprising:*

*a table surface the table surface having a first zone and having a perforation density of at least 200 perforations per square foot or 10% of the first zone, the perforations operative to produce a down force across the table surface when subject to pressure differential, the perforation density is adapted to produce a down force which is greater than the down force produced outside the first zone, a predetermined number of the perforations in the first zone arranged on curved lines.*

*27. A vacuum hold down surface according to claim 26 wherein the perforations have a perforation density of about 2,100 perforations per square foot.*

*28. A hold down table comprising:*

*a table surface having a perforation density of at least 1,000 perforations per square foot, the perforations operative to produce a down force across the table surface when subject to pressure differential, the table surface having a first zone in which the perforation density is adapted to produce a down force which is greater than the down force produced outside the first zone, a predetermined number of the perforations in the first zone arranged on curved lines.*

*29. A vacuum hold down surface according to claim 28 wherein the perforations have a perforation density of about 2,100 perforations per square foot.*

*30. The hold down table according to claim 28 further including:*

*means to subject the table surface to a pressure differential and generate a down force across the table surface.*

*31. The hold down table according to claim 28 wherein a predetermined number of the perforations are arranged along a generally sinusoidal line.*

*32. The hold down table according to claim 28 wherein the size or a shape of the first zone corresponds approximately to the workpiece.*

*33. A vacuum hold-down surface for holding a workpiece, comprising:*

*a surface sheet having perforations located along at least one curved line;*

*the perforations of the surface sheet being arranged to generally conform to a surface of the workpiece;*

*the perforations of the surface sheet operative to provide a retention force on the workpiece when a pressure differential is applied across the surface sheet.*

*34. The vacuum hold down surface according to claim 33 wherein the at least one curved line has an average radius of curvature from about 0.1 inches to about 100 inches.*

*35. The vacuum hold down surface according to claim 33 wherein the perforations in the surface sheet are distributed, the surface sheet having a first zone and a second zone, the perforations in the first zone having a first density that differs from a second density of the perforations in the second zone.*

*36. The vacuum hold down surface according to claim 35 wherein the first zone corresponds approximately in size or shape to the workpiece.*

*37. The vacuum hold down surface according to claim 33 wherein the curved line is a generally sinusoidal line.*

*38. A vacuum hold-down surface for holding a workpiece, comprising:*

*a table surface sheet for receiving the workpiece;*

*a central zone having a size and a shape that corresponds approximately to the workpiece and an outer zone deposed about the central zone;*

*said table surface sheet having perforations located in at least the central zone and the outer zone, said zones having different aperture densities for providing different effective hold down forces on the workpiece.*

*39. The vacuum hold-down surface according to claim 38, wherein the perforations in the central zone conveys a first hold down force on the workpiece in the central zone, and the perforations in the outer zone conveys a second hold down force on the workpiece in the outer zone.*

*40. The vacuum hold-down surface according to claim 38, wherein the second hold down force is lesser than the first hold down force.*

*41. The vacuum hold-down surface according to claim 38, wherein at least a number of the perforations in the central zone are arranged on curved lines.*

*42. The vacuum hold-down surface according to claim 38, wherein at least a number of the perforations are arranged along a generally sinusoidal line.*

*43. The vacuum hold-down surface according to claim 38, wherein the perforations have a perforation density of at least 1,000 perforations per square foot.*

*44. A vacuum hold down surface according to claim 38 wherein the perforations have a perforation density of at least 2,100 perforations per square foot.*

*45. A vacuum hold down surface according to claim 38 wherein the perforations have a perforation density of at least 200 perforations per square foot or 10% of the central zone.*

*46. A vacuum hold down table comprising a perforated work table surface having at least one inner zone and at least one outer zone, and means to cause a pressure differential across said perforated work table surface so that ambient pressure causes a down force on workpieces placed on said perforated work table surface, said perforated work table surface having an aperture density of at least 200 perforations per square foot or 10% of the at least one inner zone, wherein the aperture density, in combination with the pressure differential produces a hold down force on a workpiece which is at least 20% greater than the hold down force produced on a workpiece on the balance of the perforated work table surface, wherein the apertures in at least a center zone are arranged on curved lines.*

*47. A vacuum hold down surface according to claim 46 wherein the perforations have a aperture density of about 2,100 perforations per square foot.*

*48. A vacuum hold-down surface for holding a workpiece, comprising:*

*a table surface sheet for receiving the workpiece;*

*a central zone having a size and a shape that corresponds approximately to the workpiece and an outer zone deposed about the central zone;*

*said table surface sheet having perforations located in at least the central zone and the outer zone, said zones having different aperture densities for providing different effective hold down forces on the workpiece;*

*wherein said table surface sheet has an aperture density of at least 200 perforations per square foot or 10% of the central zone.*

*49. A vacuum hold down surface according to claim 48 wherein the perforations have an aperture density of about 2,100 perforations per square foot.*

* * * * *